(12) United States Patent
Yamamoto et al.

(10) Patent No.: US 8,465,210 B2
(45) Date of Patent: Jun. 18, 2013

(54) ROLLING BEARING UNIT FOR WHEEL

(75) Inventors: Seiji Yamamoto, Wakayama (JP);
Tetsuya Ishikawa, Kashiwara (JP);
Syuuji Nagata, Osaka (JP); Changxin Yu, Ageo (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 902 days.

(21) Appl. No.: 12/232,822

(22) Filed: Sep. 24, 2008

(65) Prior Publication Data
US 2009/0092349 A1    Apr. 9, 2009

(30) Foreign Application Priority Data

Sep. 25, 2007 (JP) ................. 2007-247581

(51) Int. Cl.
*F16C 13/00* (2006.01)
*F16C 35/00* (2006.01)
*F16C 33/58* (2006.01)

(52) U.S. Cl.
USPC ............ 384/589; 384/571; 384/586; 384/544

(58) Field of Classification Search
USPC ................ 384/448, 490, 504, 537, 542–544, 384/569, 586, 589, 571; 29/898.07, 898.09
See application file for complete search history.

(56) References Cited

U.S. PATENT DOCUMENTS

| | | | | |
|---|---|---|---|---|
| 5,159,754 A | * | 11/1992 | Vancsik | 29/898.07 |
| 6,158,124 A | * | 12/2000 | Austin | 29/898.09 |
| 6,406,186 B1 | | 6/2002 | Torii et al. | |
| 6,585,420 B2 | * | 7/2003 | Okada et al. | 384/448 |
| 6,879,149 B2 | * | 4/2005 | Okada et al. | 384/448 |
| 2001/0016092 A1 | * | 8/2001 | Komaba et al. | 384/589 |
| 2003/0165280 A1 | | 9/2003 | Hofmann et al. | |
| 2006/0269181 A1 | * | 11/2006 | Hattori et al. | 384/544 |
| 2008/0174169 A1 | * | 7/2008 | Seo | 29/898.04 |
| 2009/0199660 A1 | | 8/2009 | Ozaki et al. | |

FOREIGN PATENT DOCUMENTS

| | | |
|---|---|---|
| EP | 2006652 A2 * | 12/2008 |
| JP | 59-226118 A | 12/1984 |
| JP | 01-276070 A | 11/1989 |

(Continued)

OTHER PUBLICATIONS

Extended European Search Report dated Aug. 23, 2010.

(Continued)

*Primary Examiner* — Marcus Charles
(74) *Attorney, Agent, or Firm* — McGinn IP Law Group, PLLC

(57) ABSTRACT

A rolling bearing unit for a wheel includes an outer ring member having a flange portion formed on its outer periphery and fitted to a vehicle body-side member, an inner ring member rotatably fitted in the outer ring member, and double-row rolling elements arranged between the outer ring member and the inner ring member. The flange portion includes a first flange portion formed on the upper-side portion of the outer periphery, and a second flange portion and a third flange portion formed on the lower-side portion of the outer periphery. Each of the first, second and third flange portion has a bolt-hole used to fit the outer ring member to the vehicle body-side member. The first flange portion is formed in such a manner that the bolt-hole thereof is positioned on the vertical line that passes through the rotational center of the outer ring member.

9 Claims, 5 Drawing Sheets

FOREIGN PATENT DOCUMENTS

| | | | |
|---|---|---|---|
| JP | 03-006458 A | | 1/1991 |
| JP | 10-324106 A | | 12/1998 |
| JP | 2002-187403 A | | 7/2002 |
| JP | 2002-187404 | | 7/2002 |
| JP | 2003-025803 A | | 1/2003 |
| JP | 2003094905 A | * | 4/2003 |
| JP | 2003-148502 (A) | | 5/2003 |
| JP | 2003-254345 A | | 9/2003 |
| JP | 2003-269478 | | 9/2003 |
| JP | 2007-131164 (A) | | 5/2007 |
| JP | 2007126087 A | * | 5/2007 |
| JP | 2007247904 A | * | 9/2007 |
| JP | 2007271044 A | * | 10/2007 |
| JP | 2007309413 A | * | 11/2007 |
| JP | 2008051275 A | * | 3/2008 |
| WO | WO 2007/105365 (A1) | | 9/2007 |

OTHER PUBLICATIONS

Notification of Reasons for Refusal dated Aug. 7, 2012, with English-language translation.

* cited by examiner

ROLLING BEARING UNIT FOR WHEEL

CROSS-REFERENCE TO RELATED APPLICATIONS

The present application claims priority from Japanese Patent Application No. 2007-247581 filed on Sep. 25, 2007, the disclosure of which, including the specification, drawings and abstract, is incorporated herein by reference in its entirety.

BACKGROUND OF THE INVENTION

1. Field of the Invention

The invention relates to a rolling bearing unit for a wheel.

2. Description of the Related Art

For example, Japanese Patent Application Publication No. 1-276070 (JP-A-1-276070) and Japanese Patent Application Publication No. 3-6458 (JP-A-3-6458) each describe a rolling bearing unit that supports a wheel of, for example, an automobile. The bearing unit described in each of JP-A-1-276070 and JP-A-3-6458 includes an outer ring member that is fixed to a vehicle body-side member, an inner ring member that is rotatably fitted in the outer ring member, and double-row rolling elements that are arranged between the outer ring member and the inner ring member in such a manner that the rolling elements are able to roll therebetween. In the bearing unit described in each of JP-A-1-276070 and JP-A-3-6458, a plurality of flange portions is formed on the outer periphery of the outer ring member in such a manner that the flange portions project outward from the outer periphery. The bearing unit is fixed to a vehicle suspension with bolts that are fitted in bolt-holes formed in the flange portions.

Various loads such as a vehicle weight are applied to the outer ring member via the rolling elements. However, in existing bearing units such as the bearing units described in JP-A-1-276070 and JP-A-3-6458, the circumferential location of the flange portions is determined based on the location of bolt-holes formed in the vehicle body-side member. That is, there has been no bearing unit in which the circumferential location of flange portions is determined with the rigidity of an outer ring member taken into account.

SUMMARY OF THE INVENTION

The invention provides a rolling bearing unit for a wheel with which an outer ring member is provided with greater rigidity and a vehicle is operated more stably.

A first aspect of the invention relates to a rolling bearing unit for a wheel that includes: an outer ring member that has a flange portion which is formed on the outer periphery of the outer ring member and which is fitted to a vehicle body-side member; an inner ring member that is rotatably fitted in the outer ring member; and double-row rolling elements that are arranged between the outer ring member and the inner ring member in such a manner that the rolling elements are able to roll between the outer ring member and the inner ring member. The flange portion includes a first-flange portion that is formed on the upper-side portion of the outer periphery of the outer ring member, and a second flange portion and a third flange portion that are formed on the lower-side portion of the outer periphery of the outer ring member. Each of the first flange portion, the second flange portion and the third flange portion has a bolt-hole that is used to fit the outer ring member to the vehicle body-side member. The first flange portion is formed in such a manner that the bolt-hole of the first flange portion is positioned on the vertical line that passes through the rotational center of the outer ring member.

In the rolling bearing unit for a wheel according to the first aspect of the invention, the flange portion formed on the outer periphery of the outer ring member includes the first flange portion that is formed on the upper-side portion of the outer periphery of the outer ring member, and the second flange portion and the third flange portion that are formed on the lower-side portion of the outer periphery of the outer ring member. In addition, the flange portion is formed in such a manner that the bolt-hole of the first flange portion is positioned on the vertical line that passes through the rotational center of the outer ring member. In a rolling bearing unit, all the rolling elements bear the load directed in the axial direction. Therefore, the load are dispersed and then applied to the outer ring member. In contrast, mainly the rolling element that is positioned on the upper side bears the load directed in the radial direction. Therefore, the load that is applied to the upper-side portion of the rolling element in the radial direction is higher than the load that is applied to the upper-side portion of the rolling element in the axial direction. Accordingly, the flange portion used to fit the outer ring member to the vehicle body-side member is arranged on the upper-side portion of the outer ring member, to which the loads are applied via the rolling elements in a concentrated manner. More specifically, the flange portion is arranged on the upper-side portion of the outer ring member at a position on the vertical line that passes through the rotational center of the outer ring member. Then, a bolt is fitted in the bolt-hole of the flange portion to fix the outer ring member to a vehicle suspension at the flange portion. Thus, the distance between a portion to which the loads are applied via the rolling elements and a portion that bears these loads is reduced, whereby a moment load about the bolt used to fit the outer ring member to the vehicle body-side member, the moment load being applied to the outer ring member, is reduced. As a result, deformation of the outer ring member due to the loads is suppressed, which makes it possible to operate the vehicle more stably.

In the first aspect of the invention, an angle that is formed between the line that connects the rotational center of the outer ring member to the center of the bolt-hole of the second flange portion and the line that connects the rotational center of the outer ring member to the center of the bolt-hole of the third flange portion may be within a range from 30 degrees to 100 degrees. In this case, the two lower flange portions are arranged at positions that are close to the vertical line which extends in the main direction of load application, as compared with the case in which the three flange portions are arranged at regular intervals (at intervals of 120 degrees) in the circumferential direction of the outer ring member. In this way, the outer ring member is provided with greater rigidity.

In the first aspect of the invention, the number of the flange portions that are formed on the outer periphery of the outer ring member and that are fitted to the vehicle body-side member may be three.

A second aspect of the invention relates to a rolling bearing unit for a wheel that includes: an outer ring member that has a flange portion which is formed on the outer periphery of the outer ring member and which is fitted to a vehicle body-side member; an inner ring member that is rotatably fitted in the outer ring member; and double-row rolling elements that are arranged between the outer ring member and the inner ring member in such a manner that the rolling elements are able to roll between the outer ring member and the inner ring member. The flange portion includes a first flange portion and a second flange portion that are formed on the upper-side portion of the outer periphery of the outer ring member, and a third flange portion and a fourth flange portion that are formed on the lower-side portion of the outer periphery of the outer ring member. Each of the first flange portion, the second flange portion, the third flange portion and the fourth flange portion has a bolt-hole that is used to fit the outer ring member to the vehicle body-side member. The first flange portion is symmetrical to the second flange portion with respect to the vertical line that passes through the rotational center of the outer ring member, and the third flange portion is symmetrical to the fourth flange portion with respect to the vertical line that passes through the rotational center of the outer ring member. A first angle that is formed between the line that connects the center of the bolt-hole of the first flange portion to the rotational center of the outer ring member and the line that connects the center of the bolt-hole of the second flange portion to the rotational center of the outer ring member differs from a second angle that is formed between the line that connects the center of the bolt-hole of the third flange portion to the rotational center of the outer ring member and the line that connects the center of the bolt-hole of the fourth flange portion to the rotational center of the outer ring member.

In the second aspect of the invention, the smaller angle from among the first angle and the second angle may be within a range of 20 degrees to 70 degrees.

With the rolling bearing unit for a wheel according to each aspect of the invention, the outer ring member is provided with greater rigidity and the vehicle is operated more stably.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
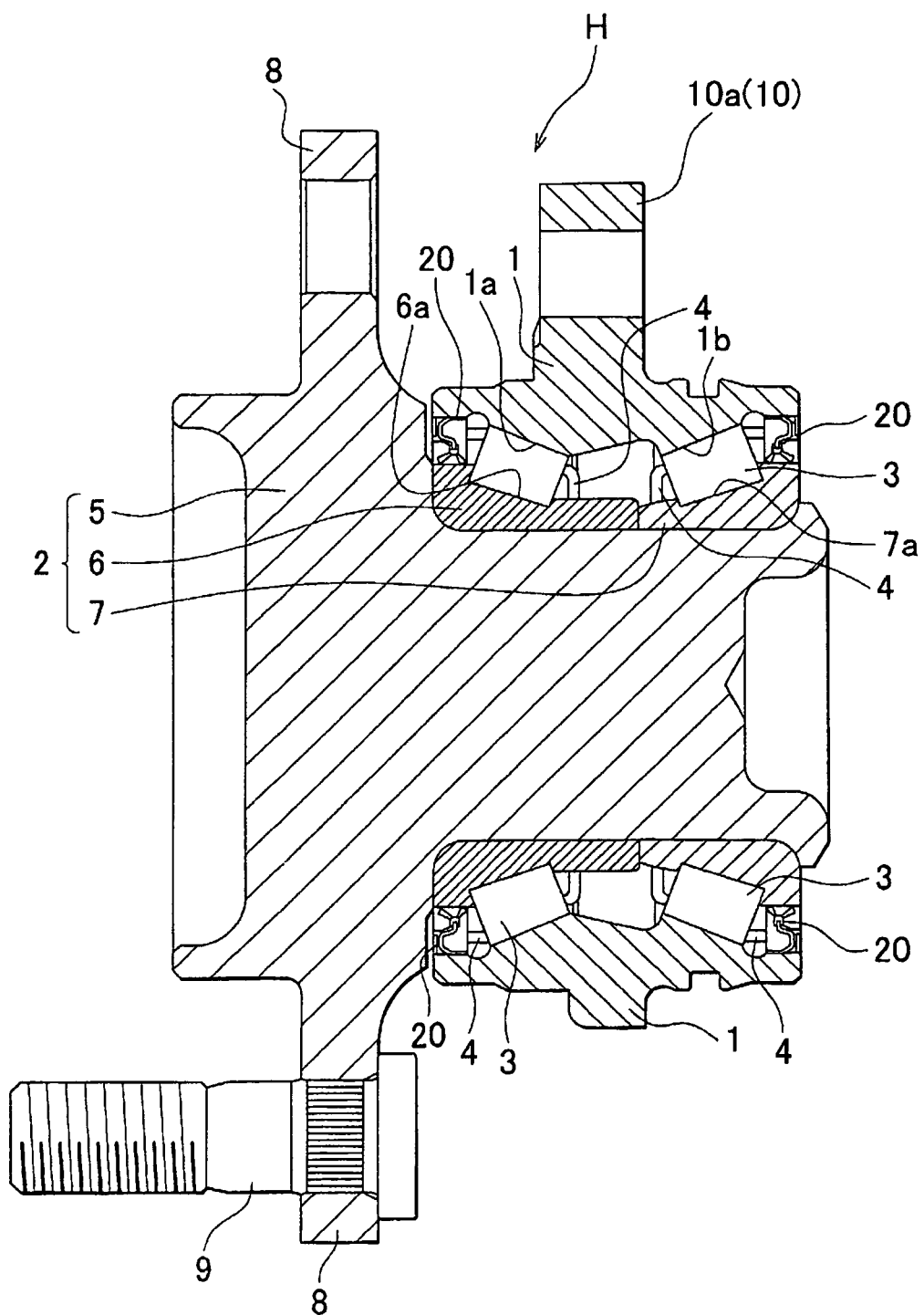
FIG. 1 is an axial cross-sectional view of a bearing unit according to a first embodiment of the invention.

Hereafter, a rolling bearing unit (hereinafter, simply referred to as "bearing unit" where appropriate) for a wheel according to each embodiment of the invention will be described in detail with reference to the accompanying drawings. FIG. 1 is an axial cross-sectional view of a bearing unit H according to a first embodiment of the invention. The bearing unit H includes a cylindrical outer ring member 1, an inner ring member 2 that is rotatably fitted in the outer ring member 1, and tapered rollers 3 that are double-row rolling elements which are arranged between the outer ring member 1 and the inner ring member 2 in such a manner that the rolling elements are able to roll therebetween. The tapered rollers 3 in each row are held by retainers 4 that are arranged at regular intervals in the circumferential direction of the bearing unit H.

The inner ring member 2 includes a hub spindle 5 to which a wheel (not shown) is fitted, and a first inner ring 6 and a second inner ring 7 that are fixed to the outer peripheral face of the hub spindle 5. Further, the tapered rollers 3 are arranged between outer ring raceways 1a and 1b and inner ring raceways 6a and 7a in such a manner that the tapered rollers 3 are able to roll therebetween. The outer ring raceways 1a and 1 are formed in the inner peripheral face of the outer ring member 1. The inner ring raceways 6a and 7a are formed in the outer peripheral faces of the first and second inner rings 6 and 7, respectively. The inner ring raceways 6a and 7a face the outer ring raceways 1a and 1b, respectively. Seal members 20 seal an annular clearance left between the outer ring member 1 and the inner ring 6 and another annular clearance left between the outer ring member 1 and the inner ring 7.

Figure 2:
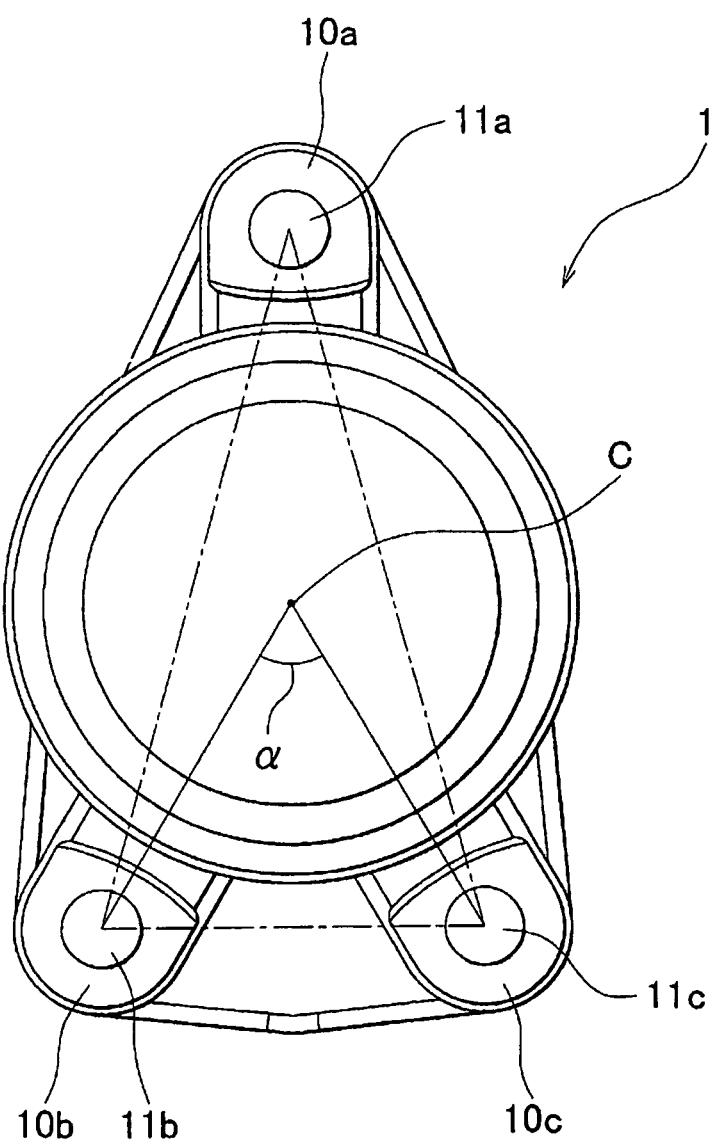
FIG. 2 is a front view of an outer ring member in the bearing unit shown in FIG. 1.

The hub spindle 5 is provided with a flange portion 8 which extends outward in the radial direction of the hub spindle 5. The flange portion 8 is formed at a position near an end portion of the hub spindle 5, the end portion being on the vehicle outboard side (left side in FIG. 1). A tire wheel and a brake disc of the wheel are fitted to the flange portion 8. The tire wheel and the like are fitted to the flange portions 8 with fitting bolts 9. Further, a flange portion 10 is formed on the outer periphery of the outer ring member 1. The flange portion 10 is used to fix the bearing unit H to a knuckle (not shown) included in a suspension, which is a vehicle body-side member. As shown in FIG. 2, the flange portion 10 includes a first flange portion 10a, a second flange portion 10b and a third flange portion 10c. The first flange portion 10a is formed on the upper-side portion of the outer periphery of the outer ring member 1 (the portion which is on the upper side in FIGS. 1 and 2 and also on the upper side when the bearing unit H is fitted to a vehicle body). The second and third flange portions 10b and 10c are formed on the lower-side portion of the outer periphery of the outer ring member 1. The first flange portion 10a, the second flange portion 10b and the third flange portion 10c have a bolt-hole 11a, a bolt-hole 11b and a bolt-hole 11c, which are used to fit the bearing unit H to the vehicle body, respectively. The flange portion 10 is fixed to the knuckle with bolts (not shown) that are fitted in these bolt-holes 11a, 11b and 11c.

In the first embodiment, the first flange portion 10a is formed in such a manner that the bolt-hole 11a of the first flange portion 10a is positioned on the vertical line that passes through a rotational center C of the outer ring member 1. In this manner, the flange portion 10a, which is used to fix the bearing unit H to the vehicle body, is arranged on the upper-side portion of the outer ring member 1, to which the loads are applied via the tapered rollers 3 in a concentrated manner. More specifically, the flange portion 10a is arranged on the upper-side portion of the outer ring member 1 at a position on the vertical line that passes through the rotational center C of the outer ring member 1. Then, the bolt is fitted in the bolt-hole 11a of the flange portion 10a to fix the outer ring member 1 to the suspension of the vehicle body at the flange portion 10a. In this way, the distance between a portion to which the loads are applied via the tapered rollers 3 and a portion that bears these loads is reduced, whereby a moment load about the bolt used to fit the outer ring member 1 to the vehicle body, the moment load being applied to the outer ring member 1, is reduced. As a result, deformation of the outer ring member 1 due to the loads is suppressed, which makes it possible to operate the vehicle more stably.

According to the first embodiment, an angle α that is formed between the line which connects the rotational center C of the outer ring member 1 to the center of the bolt-hole 11b of the second flange portion 10b and the line which connects the rotational center C of the outer ring member 1 to the center of the bolt-hole 11c of the third flange portion 10c is set to a value within a range from 30 degrees to 100 degrees. In this case, the two lower flange portions 10b and 10c are arranged at positions that are close to the vertical line which extends in the main direction of load application, as compared with the case in which the three flange portions 10a, 10b and 10c are arranged at regular intervals (at intervals of 120 degrees) in the circumferential direction of the outer ring member 1. In this way, the outer ring member 1 is provided with greater rigidity. The optimum value of the angle α varies to some extent depending on the shape and size of the flange portion 10. However, when three flange portions are formed on the outer periphery of the outer ring member, the outer ring member is provided with greater rigidity if the angle α is set to a value within the range from approximately 30 degrees to approximately 100 degrees.

Figure 3:
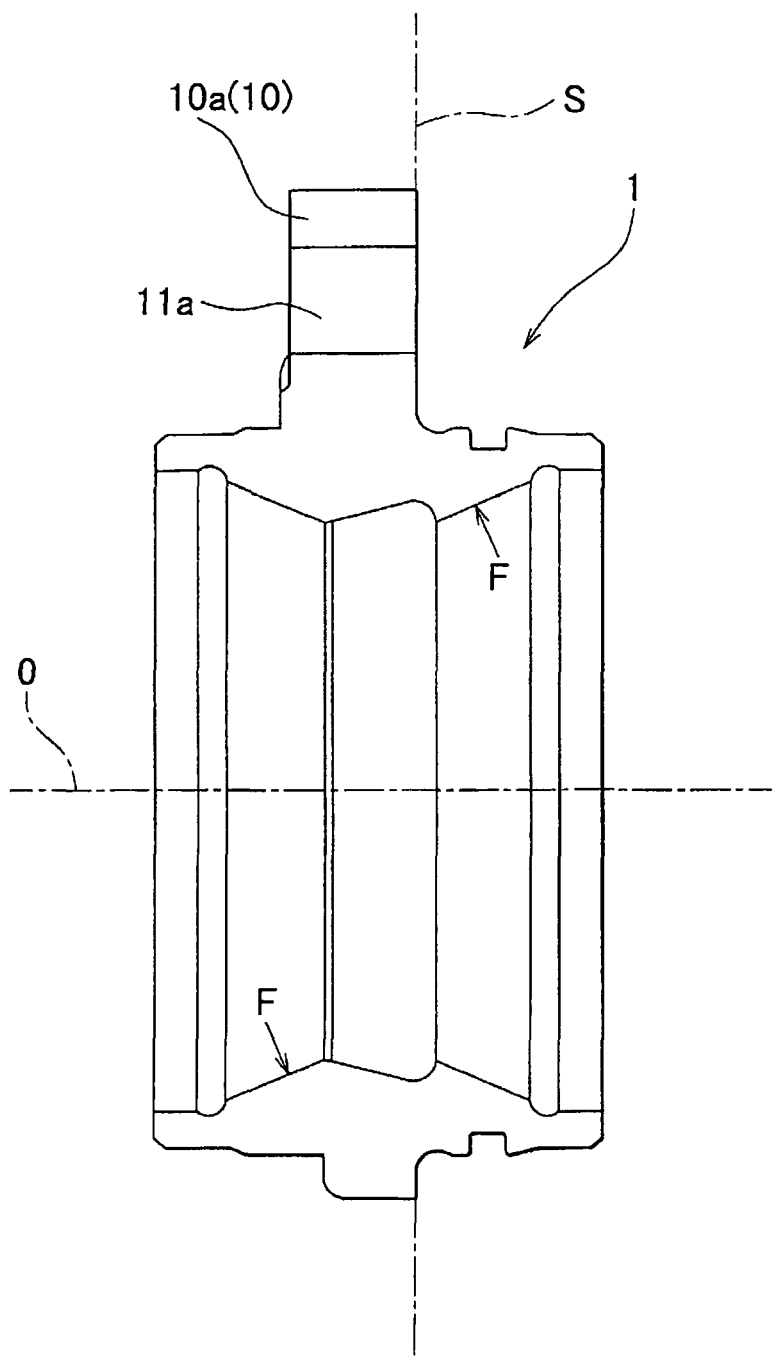
FIG. 3 is an axial cross-sectional view of the outer ring member in the bearing unit shown in FIG. 1.
Figure 4:
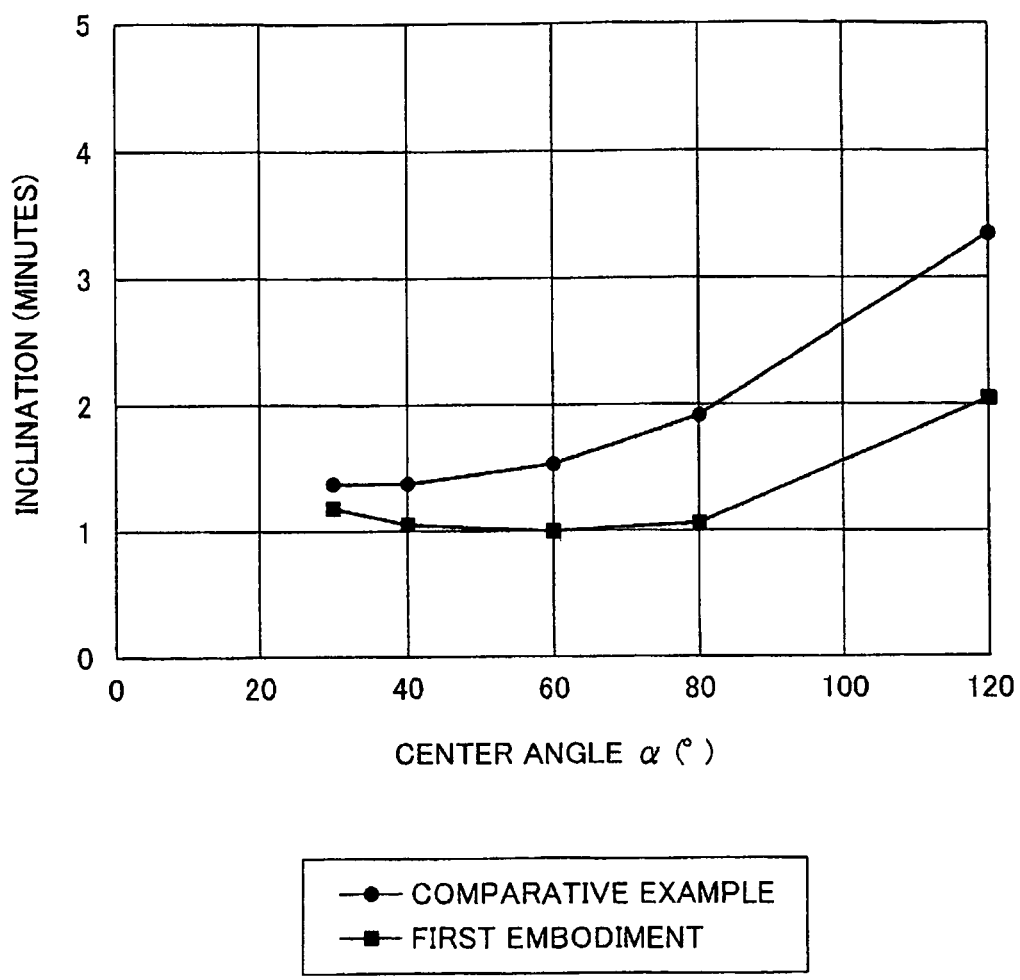
FIG. 4 is a graph showing the relationship between an angle formed by flange portions that are formed on the lower-side portion of the outer ring member and an inclination of the central axis of the outer ring member.

FIG. 4 shows the results obtained by calculating the inclination of a central axis O of the outer ring member 1 by the finite element method (FEM) when the angle α is changed. The calculation is performed on the assumption that the loads are applied to portions indicated by arrows F in FIG. 3. In addition, the calculation is performed on the assumption that the outer ring member 1 is securely fixed to the knuckle with the bolts, and the bolts are fitted in the bolt-holes 11a, 11b and 11c of the flange portion 10 to fix the outer ring member 1 to the knuckle. The inclination (minutes) of the central axis O of the outer ring member 1 with respect to a fitting face S of the flange portion 10 is calculated. The outer ring member 1 is fitted to the knuckle at the fitting face S. FIG. 4 shows the inclination of the central axis O in the first embodiment and the inclination in a comparative example. In the first embodiment, the bolt-hole 11a of the first flange portion 10a is positioned on the vertical line that passes through the rotational center C of the outer ring member 1, as shown in FIGS. 1 to 3. In contrast, in the comparative example, the orientation of outer ring member 1 is upside-down of the orientation of the ring member in the first embodiment. That is, one of the flange portions is arranged on the lower-side portion of the outer ring member 1 and the bolt-hole of this flange portion is positioned on the vertical line that passes through the rotational center C of the outer ring member 1.

The value of the inclination indicated by the ordinate axis in FIG. 4 shows the rigidity of the outer ring member 1. The smaller the value of the inclination is, the greater the rigidity of the outer ring member 1 is. FIG. 4 shows that the rigidity in the first embodiment is greater than the rigidity in the comparative example at every angle in the calculation range. FIG. 4 also shows that the inclination in the first embodiment is substantially equal to or smaller than the minimum inclination obtained in the comparative example at every angle in the range from 30 degrees to 100 degrees.

Figure 5:
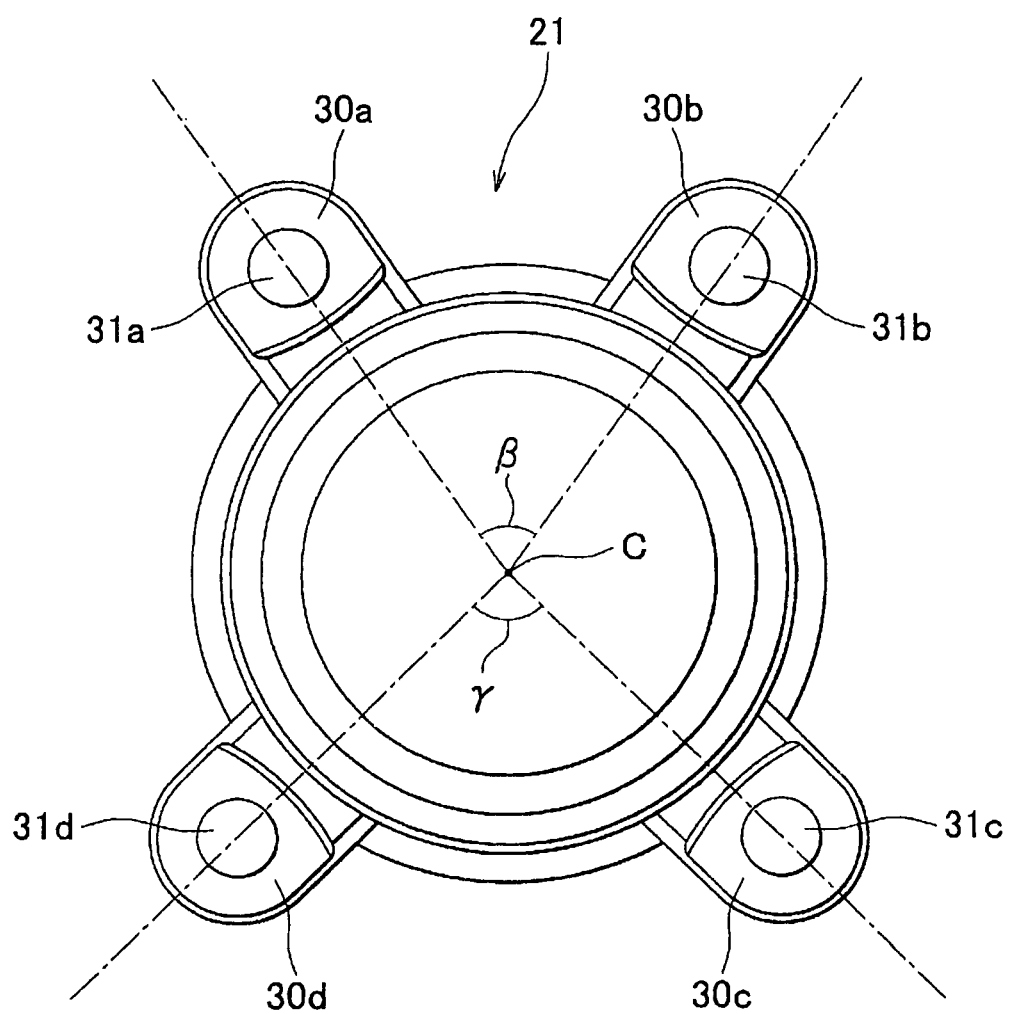
FIG. 5 is a front view of an outer ring member in a bearing unit according to a second embodiment of the invention.

FIG. 5 is a front view of an outer ring member in a bearing unit according to a second embodiment of the invention. In the second embodiment, four flange portions 30a, 30b, 30c and 30d are formed on the outer periphery, of an outer ring member 21. The first flange portions 30a and the second flange portion 30b are arranged on the upper-side portion of the outer ring member 21, and the third flange portion 30c and the fourth flange portion 30d are arranged on the lower-side portion of the outer ring member 21. The first flange portion 30a is symmetrical to the second flange portion 30b with respect to the vertical line that passes through a rotational center C of the outer ring member 21. Further, the third flange portion 30c is symmetrical to the fourth flange portion 30d with respect to the vertical line that passes through the rotational center C of the outer ring member 21. In addition, an angle β which is formed between the line that connects the center of a bolt-hole 31a of the first flange portion 30a to the rotational center C of the outer ring member 21 and the line that connects the center of a bolt-hole 31b of the second flange portion 30b to the rotational center C of the outer ring member 21 differs from an angle γ which is formed between the line that connects the center of a bolt-hole 31c of the third flange portion 30c to the rotational center C of the outer ring member 21 and the line that connects the center of a bolt-hole 31d of the fourth flange portion 30d to the rotational center C of the outer ring member 21.

In the second embodiment, the angle β is set to a value that is smaller than the angle γ and that is within a range from 20 degrees to 70 degrees. If the angle β is set to a value within this range, the two flange portions are arranged on the upper-side portion of the outer ring member, to which the loads are applied in a concentrated manner. More specifically, the two flange portions are arranged on the upper-side portion of the outer ring member at positions near the vertical line that passes through the rotational center C of the outer ring member 21. In this way, it is possible to reduce the moment load about the bolt used to fit the outer ring member to the vehicle body, which is applied to the outer ring member. As a result, deformation of the outer ring member 1 is suppressed, which makes it possible to operate the vehicle more stably.

In the second embodiment, instead of setting the angle β to a value that is smaller than the angle γ and that is within the range from 20 degrees to 70 degrees, the angle γ may be set to a value that is smaller than the angle β and that is within a range from 20 degrees to 70 degrees. In this case as well, it is possible to reduce the moment load that is applied to the outer ring member 21. As a result, deformation amount of the outer ring member 21 is suppressed, which makes it possible to operate the vehicle more stably.

What is claimed is:

1. A rolling bearing unit for a wheel, comprising:
   an outer ring member that includes a flange portion which is formed on an outer periphery of the outer ring member and which is fitted to a vehicle body-side member;
   an inner ring member that is rotatably fitted in the outer ring member; and
   double-row rolling elements that are arranged between the outer ring member and the inner ring member such that the rolling elements are able to roll between the outer ring member and the inner ring member,
   wherein the flange portion includes a first flange portion that is formed on an upper-side portion of the outer periphery of the outer ring member, and a second flange portion and a third flange portion that are formed on a lower-side portion of the outer periphery of the outer ring member,
   wherein each of the first flange portion, the second flange portion and the third flange portion includes a bolt-hole that is used to fit the outer ring member to the vehicle body-side member,
   wherein the first flange portion is formed such that the bolt-hole of the first flange portion is positioned on a vertical line that passes through a rotational center of the outer ring member, and
   wherein an angle that is formed between a line that connects the rotational center of the outer ring member to a center of the bolt-hole of the second flange portion and a line that connects the rotational center of the outer ring member to a center of the bolt-hole of the third flange portion is equal to or less than 100 degrees so as to enhance a rigidity of the outer ring when the flange portion is fitted to the vehicle body-side member.

2. The rolling bearing unit for a wheel according to claim 1, wherein an angle that is formed between a line that connects the rotational center of the outer ring member to the center of the bolt-hole of the second flange portion and a line that connects the rotational center of the outer ring member to the center of the bolt-hole of the third flange portion is within a range from 30 degrees to 100 degrees.

3. The rolling bearing unit according to claim 1, wherein the number of the flange portions that are formed on the outer periphery of the outer ring member and that are fitted to the vehicle body-side member is three.

4. The rolling bearing unit according to claim 1, wherein the rolling elements comprise tapered rollers.

5. The rolling bearing unit according to claim 1, wherein the vertical line extends in a direction of a normal force.

6. A rolling bearing unit for a wheel, comprising:
an outer ring member that includes a flange portion which is formed on an outer periphery of the outer ring member and which is fitted to a vehicle body-side member;
an inner ring member that is rotatably fitted in the outer ring member; and
double-row rolling elements that are arranged between the outer ring member and the inner ring member such that the rolling elements are able to roll between the outer ring member and the inner ring member,
wherein the flange portion includes a first flange portion and a second flange portion that are formed on an upper-side portion of the outer periphery of the outer ring member, and a third flange portion and a fourth flange portion that are formed on a lower-side portion of the outer periphery of the outer ring member,
wherein each of the first flange portion, the second flange portion, the third flange portion and the fourth flange portion includes a bolt-hole that is used to fit the outer ring member to the vehicle body-side member,
wherein the first flange portion is symmetrical to the second flange portion with respect to a vertical line that passes through a rotational center of the outer ring member, and the third flange portion is symmetrical to the fourth flange portion with respect to the vertical line that passes through the rotational center of the outer ring member, and
wherein a first angle that is formed between a line that connects a center of the bolt-hole of the first flange portion to the rotational center of the outer ring member and a line that connects a center of the bolt-hole of the second flange portion to the rotational center of the outer ring member differs from a second angle that is formed between a line that connects a center of the bolt-hole of the third flange portion to the rotational center of the outer ring member and a line that connects a center of the bolt-hole of the fourth flange portion to the rotational center of the outer ring member, and
wherein the second angle comprises a value less than a value of the first angle so as to enhance a rigidity of the outer ring when the flange portion is fitted to the vehicle body-side member.

7. The rolling bearing unit for a wheel according to claim 6, wherein the smaller angle from among the first angle and the second angle is within a range of 20 degrees to 70 degrees.

8. The rolling bearing unit according to claim 6, wherein the rolling elements comprise tapered rollers.

9. The rolling bearing unit according to claim 6, wherein the vertical line extends in a direction of a normal force.

* * * * *